Nov. 26, 1935.     E. F. MILTENBERGER     2,022,252

ROLLER BEARING

Filed June 17, 1931

INVENTOR
*Eugene F. Miltenberger*
BY
ATTORNEYS

Patented Nov. 26, 1935

2,022,252

UNITED STATES PATENT OFFICE 2,022,252

ROLLER BEARING

Eugene F. Miltenberger, Red Bank, N. J.

Application June 17, 1931, Serial No. 544,965

4 Claims. (Cl. 308—187)

One object of the present invention is to provide an improved anti-friction bearing unit which is simple, rugged, and compact, which is inexpensive to construct, and in which the rolling elements of the bearing are protected against contact with dust, dirt, or gritty foreign substances by sealing devices which also serve as lubricant storing and delivery devices for said elements.

Another object of the invention is to provide a ball or roller bearing unit which may be permanently assembled as a lubricated bearing unit at the place of manufacture, which can be easily and quickly fitted as a unit in operative position, and in which the rolling elements are effectively protected against dirt, dust and the like, and maintained in proper lubricated condition throughout the life of the bearing without the application of lubricant in addition to that contained in the bearing at the time of manufacture.

Figure 1:
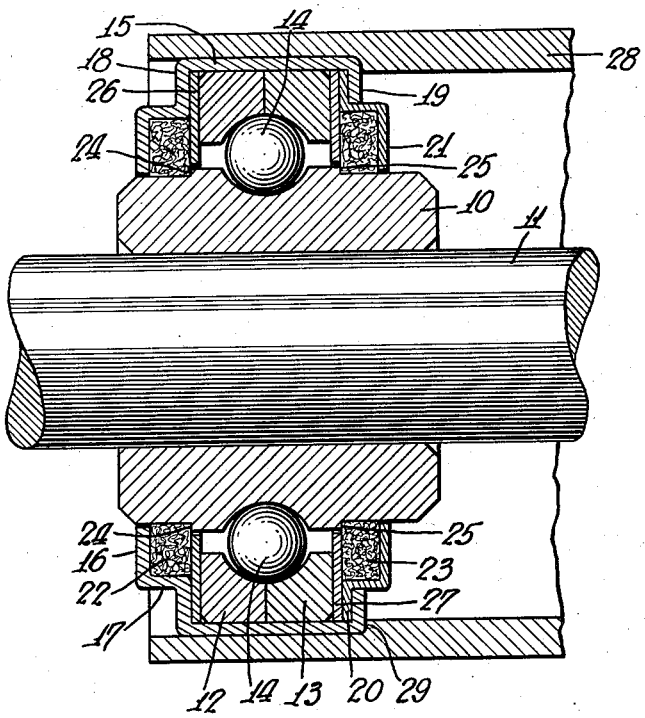
Figure 2:
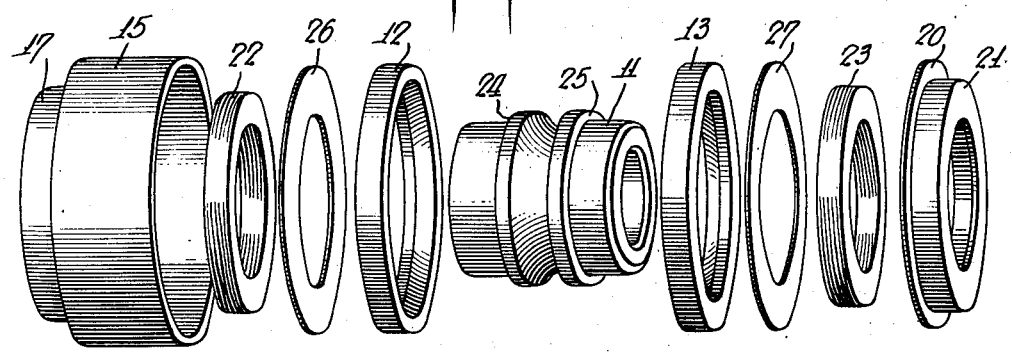

In the accompanying drawing, there is shown for purposes of illustration, one form of device embodying the invention, in which Fig. 1 is a section taken through the center of a ballbearing, and showing the invention adapted as a support for a roller used in conveyor systems of the multiple roller type, and Fig. 2 is a perspective view of the several parts of the ballbearing in spaced positions.

The specific embodiment of the present invention is herein shown as a ballbearing unit, but so far as the broader aspects of the invention are concerned, it may also be adapted for use in a roller bearing arrangement.

The ballbearing unit includes an inner race ring 10 adapted to fit on a shaft 11 which, in the particular form shown, is designed to constitute part of a conveying system of the multiple roller type for supporting and transporting articles in a factory or mill. The inner race ring 10 cooperates with a pair of rings 12 and 13 which conjointly serve as an outer race ring for a series of bearing balls 14. The inner race ring is preferably somewhat longer than the outer race ring, thus presenting protruding end portions. The two rings 12 and 13 are confined and retained in position by means of a two-part sheet metal casing having a main intermediate cylindrical portion engaging the outer periphery of these rings.

In order to retain all the elements of the ballbearing together as a unit, and to support and retain a sealing and lubricating element, the casing includes a jacket 15 and an end cap 21. The jacket 15 at one end has a radially inwardly extending flange 16, a cylindrical section 17, and a shoulder section 18, serving in part to define an annular chamber encircling the periphery of the inner race ring 10. The flange 16 has the inner periphery thereof extending close to the outer periphery of the race ring 10 adjacent to one end of the latter. The other end of the jacket 15 is provided with an inwardly extending flange 19 which, after assemblage, is spun over a flange 20 extending radially outwardly from a cap 21 closely embracing the race ring 10. This cap 21 forms an annular chamber which is similar to the annular chamber formed at the other end of the bearing by the offset portions of the jacket 15.

In order to store lubricant and to protect the bearing balls 14 against the abrasive action of objectionable, gritty substances, the ends of the bearing have sealing devices in the form of washers 22 and 23 made of absorbent material, such as felt, and closely embracing the opposite protruding ends of the race ring 10 at its outer periphery. These washers 22 and 23 are retained under compression in the annular chambers formed by the jacket 15, and the cap 21, respectively.

In order to further aid in the retention of the felt washers 22 and 23 in position, and to provide a more effective sealing joint between the race ring 10 and said washer, the ends of said race ring are reduced to form annular shoulders 24 and 25 which engage the inner surfaces of said felt washers adjoining the inner peripheries thereof. These resilient washers 22 and 23 are thicker than their confining chambers, and have larger exterior diameters and smaller internal diameters, so as to require compression in the assembly.

It is advantageous to provide thin metal washers 26 and 27 between the opposite ends of the outer race ring and the inner face surfaces of the felt washers 22 and 23. However, these washers 26 and 27 may be omitted as the outer race ring may serve to confine the felt washers in position. By means of this arrangement, the felt washers 22 and 23 are confined on all four sides, and more effectively held under compression.

The felt washers 22 and 23 not only serve to guard against ingress of objectionable foreign substances into contact with the balls 14, but are also saturated with a suitable lubricant for lubricating the rolling elements of the bearing. They each thereby form a reservoir or source of lubricant supply, the lubricant seeping to a slight extent axially along the surface of the inner race ring 10 towards the balls 14. By maintaining the felt washers 22 and 23 under compression, they press at all times against the race ring 10 to form a seal to keep out dirt, and a continuous supply of lubricant from the felt washers is insured. The felt washers are soaked in oil before being inserted, or the assembled bearing is soaked in oil after the parts are assembled. Enough oil is thus stored so that they never need to be oiled, as the oil will last as long as the bearing.

In Fig. 2 is shown the elements of the bearing ready to be assembled. In that figure, the jacket 15 is shown just before the flange 19 has been spun to engage the flange of the cap 21. In assembling the device as shown, the felt washer 22 saturated with lubricant, is first fitted axially into the annular chamber formed at the end of said jacket. This felt washer is preferably of such width that the inner face surface thereof extends beyond the shoulder 18 formed on the jacket 15. The metal washer 26 is then disposed in position into engagement with the felt washer 22, with the outer periphery of said metal washer abutting the shoulder 18 formed on the jacket 15, thereby holding the felt washer 22 under compression. The race ring section 12 is then shifted in position as shown in Fig. 1, and the inner race ring 10 passed through the center of the arrangement as already assembled until the shoulder 24 abuts the inner face surface of the felt washer 22. It is advantageous to chamfer the ends of the race ring 10 at the edges of the outer periphery thereof to facilitate the ingress of said race ring into position.

After the race ring 10 has been shifted into position, the balls 14 can then be inserted, and the outer race ring section 13 mounted to confine said balls in position. The metal washer 27, the lubricant saturated felt washer 23, and the cap 21 may then be mounted successively in position. The end of the jacket 15 can then be spun over the flange 20 of the cap 21 to hold said cap in firm position. The felt washer 23, being wider than the width of its confining chamber and of larger outside diameter, will be compressed therein.

The felt washers not only prevent the entrance of outside dirt along the inner race ring, but also seal the very narrow clearance between the washers 26 and 27 and the shoulders 24 and 25.

The arrangement as assembled and shown in Fig. 1, can be manufactured and permanently assembled as a unit, transported as a unit to the place where it is to be used, and easily and quickly fitted in position without the necessity of lubricating or assembling any parts of the bearing arrangement. Such a unit can be advantageously used in a conveying system of the multiple roller type, the unit not only serving to centrally support the conveyor roller, but also serving as an end wall therefor. In Fig. 1 is shown a conveyor roller 28, the inner periphery of one end of which is enlarged to provide a shoulder 29 engaging the flange 19 of the jacket 15. This jacket is press-fitted into the end of the roller 28 so as to be rotatable therewith.

Having thus described my invention, what I claim as new and desire to secure by Letters Patent is:—

1. A ballbearing including an inner race ring, a pair of ring sections encircling said inner race ring, and conjointly forming an outer race ring shorter than said inner race ring, a series of bearing balls disposed between said race rings, a jacket having a cylindrical portion which engages the outer periphery of said outer race ring, said jacket having one end thereof offset to form an annular chamber, a felt washer having the entire inner periphery thereof engaging the periphery of the end portion of the inner race ring, saturated with lubricant, disposed in said annular chamber, and confined therein under compression, a metal washer disposed between the inner face surface of said felt washer and the outer face surface of one of said outer race rings, a cap disposed at the other end of the bearing, embracing the outside of said inner race ring, and forming an annular chamber therewith, a second felt washer saturated with lubricant, disposed in said last mentioned annular chamber and having the entire inner periphery thereof engaging the periphery of the other end portion of said inner race ring, said second felt washer being held under compression in said chamber, and a second metal washer disposed between the outer face surface of one of said outer race rings and the inner face surface of said last mentioned felt washer, said cap having a radially outwardly extending flange abutting the outer face surface of said metal washer near the outer periphery thereof, said jacket having the end disposed near said cap turned to form a radially inwardly extending flange which engages the outwardly extending flange of said cap to hold said cap in position.

2. A ballbearing including an inner race ring, an outer race ring encircling said inner race ring, and shorter than said inner race ring, a series of bearing balls disposed between said race rings, a jacket having a cylindrical portion which engages the outer periphery of said outer race ring, and having one end thereof offset to form an annular chamber, a felt washer having the entire inner periphery thereof engaging the periphery of the inner race ring adjacent to one end thereof and disposed in said annular chamber, a cap disposed at the other end of the jacket, encircling said inner race ring, and forming an annular chamber therewith, said cap having a radially outwardly extending flange and said jacket having the end disposed near said cap turned to form a radially inwardly extending flange which engages the outwardly extending flange of said cap to hold said cap in position, and a second felt washer disposed in said last mentioned annular chamber and having the entire inner periphery thereof engaging the periphery of said inner race ring adjacent to its other end.

3. An anti-friction bearing including an inner race ring having a pair of annular, axially spaced, endwise facing shoulders, an outer race ring encircling said inner race ring, a series of anti-friction rolling members interposed between said race rings and disposed between said shoulders, a jacket having a cylindrical portion which engages the outer periphery of said outer race ring and having one end thereof offset to form an annular chamber, a felt washer firmly abutting one of said shoulders, and having the inner periphery thereof firmly engaging the periphery of the inner race ring, adjacent to one end of said inner race ring, said washer being confined in said annular chamber, a cap disposed at the other end of the jacket, encircling said inner race ring, and forming an annular chamber therewith, said cap having a radially outwardly extending flange and said jacket having the ends disposed near said cap turned to form a radially inwardly extending flange which engages the outwardly extending flange of said cap to hold said cap in position, and a second felt washer disposed in said last mentioned annular chamber, firmly abutting the other shoulder and having the entire inner periphery thereof engaging the periphery of said inner race ring adjacent to the other end of said inner race ring.

4. A preassembled anti-friction bearing includcluding an inner race ring having a pair of annular axially spaced endwise facing shoulders, anti-friction rolling members interposed between said race rings and disposed between said shoulders, a sheet metal casing formed of at least two parts and having a cylindrical portion firmly engaging said outer race ring, and also having annular chambers at the outer ends of said outer race ring encircling said inner race ring, said casing having end walls extending radially inwardly with their inner edges closely adjacent to said inner race ring and forming the outer end walls of said chambers, and felt washers confined under compression within said chambers, firmly abutting said shoulders and having the inner peripheries thereof firmly engaging said inner race ring on opposite sides of said anti-friction rolling members to seal said latter members.

EUGENE F. MILTENBERGER.